(12) United States Patent
An et al.

(10) Patent No.: US 11,279,308 B2
(45) Date of Patent: Mar. 22, 2022

(54) CRASH PAD INCLUDING AIR-BAG-DOOR-OPENING PART

(71) Applicants: HYUNDAI MOTOR COMPANY, Seoul (KR); KIA MOTORS CORPORATION, Seoul (KR); KBI DONGKOOK IND. CO., LTD., Seoul (KR); HYUNDAI MOBIS CO., LTD., Seoul (KR)

(72) Inventors: Jae Hyun An, Seosan-si (KR); Chang Hoon Yang, Suwon-si (KR); Ik Jin Jung, Ansan-si (KR); Seung Sik Han, Hwaseong-si (KR); Dong Il Son, Ulsan (KR); Chang Woo Kang, Hwaseong-si (KR); Seung Hwan Hyun, Yongin-si (KR)

(73) Assignees: HYUNDAI MOTOR COMPANY, Seoul (KR); KIA MOTORS CORPORATION, Seoul (KR); KBI DONGKOOK IND. CO., LTD., Seoul (KR); HYUNDAI MOBIS CO., LTD., Seoul (KR)

( * ) Notice: Subject to any disclaimer, the term of this patent is extended or adjusted under 35 U.S.C. 154(b) by 83 days.

(21) Appl. No.: 16/705,714

(22) Filed: Dec. 6, 2019

(65) Prior Publication Data
US 2021/0009066 A1     Jan. 14, 2021

(30) Foreign Application Priority Data
Jul. 9, 2019   (KR) .......................... 10-2019-0082504

(51) Int. Cl.
*B60R 21/045* (2006.01)
*B60R 21/2165* (2011.01)
*B60R 21/205* (2011.01)

(52) U.S. Cl.
CPC .......... *B60R 21/045* (2013.01); *B60R 21/205* (2013.01); *B60R 21/2165* (2013.01)

(58) Field of Classification Search
CPC .................... B60R 21/045; B60R 21/2165
See application file for complete search history.

(56) References Cited

U.S. PATENT DOCUMENTS

| | | | | |
|---|---|---|---|---|
| 7,464,958 | B2 * | 12/2008 | Kong ................ | B29C 45/0081 280/728.3 |
| 9,260,074 | B2 * | 2/2016 | Fujita ................. | B60R 21/2165 |
| 9,821,748 | B2 * | 11/2017 | Takahashi ........... | B60R 21/2165 |
| 10,081,327 | B2 * | 9/2018 | Toda ................... | B60R 21/2165 |
| 2014/0333052 | A1 * | 11/2014 | Fujita ................. | B60R 21/2165 280/728.3 |
| 2017/0050606 | A1 * | 2/2017 | Asakuma ............ | B60R 21/2165 |
| 2018/0222430 | A1 * | 8/2018 | Totani ................ | B32B 27/12 |

FOREIGN PATENT DOCUMENTS

KR    2005-0098645 A    10/2005

* cited by examiner

*Primary Examiner* — Faye M Fleming
(74) *Attorney, Agent, or Firm* — McDonnell Boehnen Hulbert & Berghoff LLP

(57) ABSTRACT

A crash pad including an air-bag-door-opening part is provided, which includes a crash pad base, an air-bag-door-opening part, which is positioned so as to face air-bag doors disposed on the crash pad base, and an opening-inducing groove, which is formed along an opening line of the air-bag-door-opening part.

11 Claims, 4 Drawing Sheets

CRASH PAD INCLUDING AIR-BAG-DOOR-OPENING PART

CROSS REFERENCE TO RELATED APPLICATION

This application claims under 35 U.S.C. § 119(a) the benefit of priority to Korean Patent Application No. 10-2019-0082504 filed on Jul. 9, 2019, the entire contents of which are incorporated herein by reference.

BACKGROUND

(a) Technical Field

The present disclosure relates to a crash pad including an air-bag-door-opening part. More particularly, the present disclosure relates to a crash pad including an air-bag-door-opening part, in which an opening-inducing groove allowing for the air-bag doors to be more easily opened along the opening line and induced along the groove, is integrally formed along an opening line of a crash pad base, manufactured through vacuum molding, and which includes an air-bag-door-opening part which faces air-bag doors.

(b) Background Art

Generally, a crash pad of a vehicle is an interior component, which is positioned at the front zone, in front of the driver's seat and the front passenger's seat, and which includes an opening hole, in which an instrument board, a center fascia panel, an air duct and the like, are mounted.

In many cases, an air bag for a driver's seat is mounted in a steering wheel, but an air bag for a front passenger's seat is mounted in a crash pad in front of the front passenger's seat.

Specifically, an air-bag-door-opening part is integrally injection-molded in the crash pad, and then an air-bag module including an air-bag housing is mounted to the bottom portion of the air-bag-door-opening part.

However, when the crash pad base is injection-molded, the crash pad base droops due to thermal deformation. Furthermore, because a plurality of post-processes are required after the injection-molding process, the manufacturing costs are high.

The above information disclosed in this Background section is only for enhancement of understanding of the background of the disclosure and therefore it may contain information that does not form the prior art that is already known in this country to a person of ordinary skill in the art.

SUMMARY

Additional features and advantages are described herein, and will be apparent from, the following Detailed Description and the figures.

The present disclosure solves the above-described issues discussed in the Background section, and it is an object of the present disclosure to provide a crash pad base, which is integrally manufactured through injection molding without a plurality of post-processes.

Furthermore, another object of the present disclosure is to provide an air-bag-door-opening part, which includes an opening line formed on the crash pad base and which is simultaneously opened at the time of opening of air-bag doors.

The objects of the present disclosure are not limited to the above-mentioned objects. Other specific details of the present disclosure will be apparent from the following detailed description and the embodiments of the present disclosure. The objects of the present disclosure may be accomplished by means disclosed in the accompanying claims and combinations thereof.

A crash pad including an air-bag-door-opening part for accomplishing the objects of the present disclosure is constructed as follows.

In one aspect, the present disclosure provides a crash pad including an air-bag-door-opening part, including a crash pad base, an air-bag-door-opening part, which is positioned so as to face air-bag doors disposed on the crash pad base, and an opening-inducing groove, which is formed along an opening line of the air-bag-door-opening part.

In a preferred embodiment, the crash pad may further include at least one reinforcing portion disposed in the opening-inducing groove formed in a rear surface of the air-bag-door-opening part.

In another preferred embodiment, the crash pad may further include a cutout portion positioned at a region at which the air-bag doors confront each other.

In still another preferred embodiment, the cutout portion may be positioned at the opening line along which the air-bag-door-opening part is opened.

In yet another preferred embodiment, the opening-inducing groove may include an upper groove positioned in an upper surface of the crash pad base, and a lower groove positioned in a lower surface of the crash pad base.

In still yet another preferred embodiment, the lower groove may be configured such that a width of a cross-section thereof is decreased moving upwards in a thickness direction of the crash pad base In a further preferred embodiment, the crash pad may further include a connecting portion, which is disposed between the upper groove and the lower groove and which is integrally formed with the crash pad base.

In another further preferred embodiment, the crash pad may further include a foam layer disposed on an upper surface of the crash pad base.

In still another further preferred embodiment, the crash pad may further include a skin layer disposed on an upper surface of the foam layer.

Other aspects and preferred embodiments of the disclosure are discussed infra.

It is understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example vehicles powered by both gasoline and electricity.

The above and other features of the disclosure are discussed herein.

BRIEF DESCRIPTION OF THE FIGURES

The above and other features of the present disclosure will now be described in detail with reference to certain exemplary embodiments thereof, illustrated in the accompanying drawings which are given hereinbelow by way of illustration only, and thus are not limitative of the present disclosure, and wherein.

Figure 1:
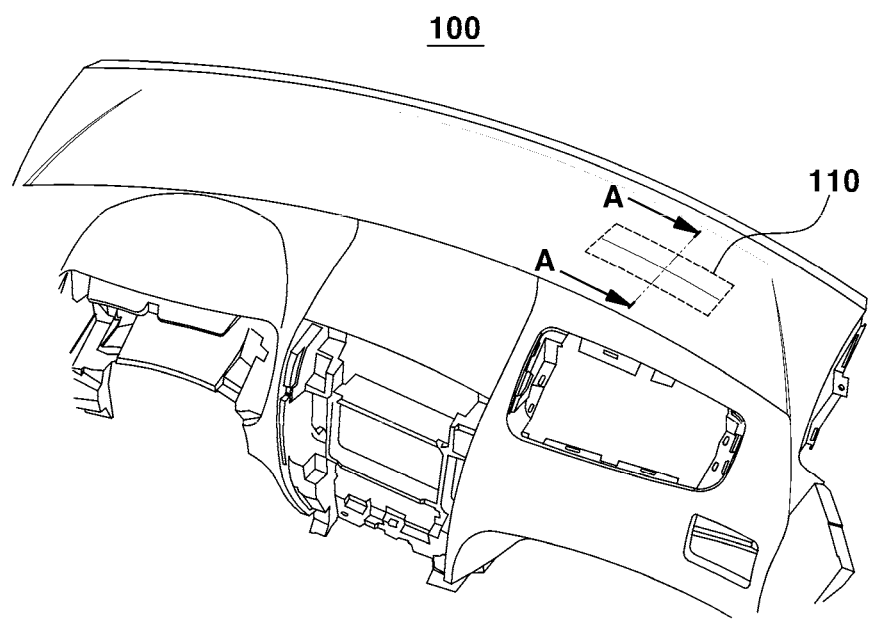
FIG. 1 is a perspective view illustrating the structure of a crash pad assembly according to an embodiment, which is manufactured through a vacuum-molding process.

It should be understood that the Figures are not necessarily to scale, presenting a somewhat simplified representation of various features illustrative of the basic principles of the disclosure. The specific design features of the present disclosure, including, for example, specific dimensions, orientations, locations, and shapes will be determined in part by the intended application and use environment.

In the Figures, reference numbers refer to the same or equivalent parts of the present disclosure throughout the Figures.

DETAILED DESCRIPTION

The present disclosure will now be described more fully with reference to the accompanying drawings, in which preferred embodiments of the disclosure are shown. The disclosure should not be construed as being limited to the embodiments set forth herein. Rather, these embodiments are provided so that this disclosure will be thorough and complete and will fully convey the scope to those skilled in the art.

The terms "part", "module" and "assembly" used in the specification mean units for processing at least one function or operation, which can be implemented by hardware components, software components, or combinations thereof.

Further, it will be understood that terms such as "upper" and "lower" are used to distinguish one element from another element depending on the relative height, and the essence, order, or sequence of corresponding elements are not limited by these terms.

The present disclosure relates to a crash pad assembly. A crash pad base 100 includes an opening line for easy opening of an air-bag-door-opening part 110, and an opening-inducing groove 120, which is formed in at least a portion of the opening line.

The opening line, which is positioned on the crash pad base 100, may be configured so as to correspond to the region at which double air-bag doors 400 are opened. When double air-bag doors 400 are rotated and opened about a hinge shaft at the upper end of the crash pad, the opening line may be configured so as to be positioned at the center of the double air-bag doors.

In an embodiment, the opening line may be formed on at least one of the center of the region of the crash pad base 100 at which the double doors are opened and the lateral sides of the region of the crash pad base 100.

The air-bag-door-opening part 110 is configured to correspond to a door, which is rotated about one end of the air-bag doors 400. The air-bag-door-opening part 110 may include the opening line along which the crash pad base 100 is broken and is rotated.

Furthermore, the present disclosure provides a crash pad including the air-bag-door-opening part 110, for preventing a foam layer 200 and a skin layer 300, which are layered on the upper surface of the crash pad base 100, from being depressed.

FIG. 1 is a perspective view of the crash pad assembly according to an embodiment, which illustrates the shape of the crash pad base 100 including the air-bag-door-opening part 110.

Figure 2A:
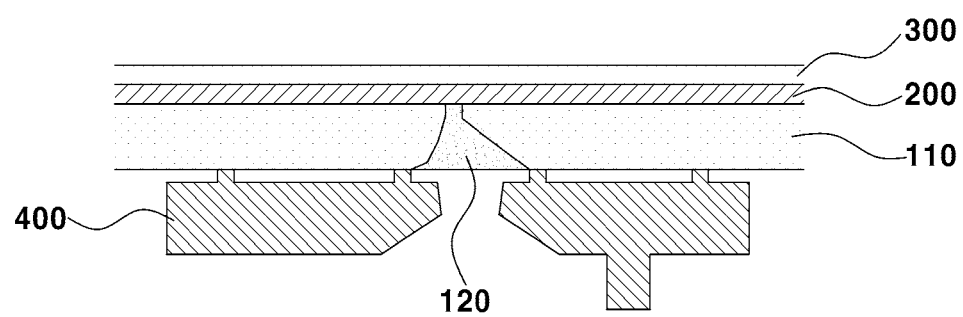
FIG. 2A is a side cross-sectional view illustrating an opening-inducing groove in a crash pad according to an embodiment, which is manufactured through a vacuum-molding process.
Figure 2B:
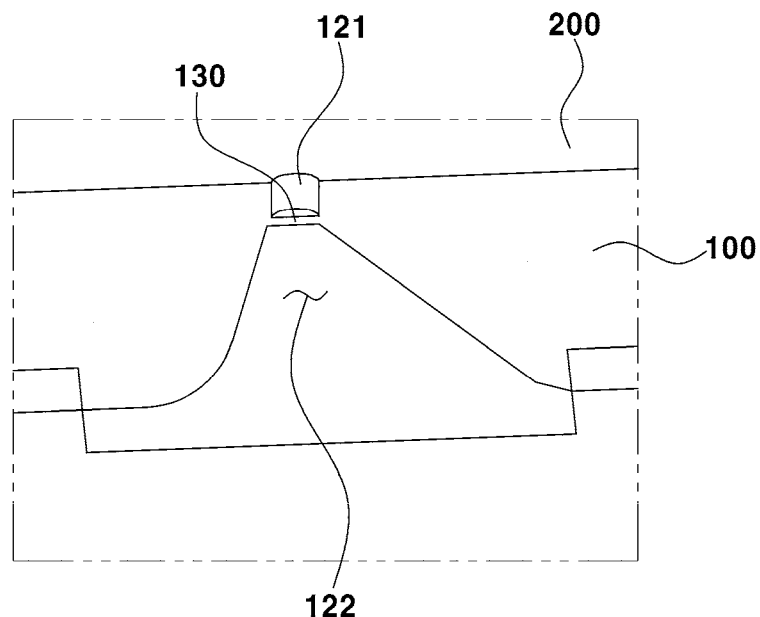
FIG. 2B is a side cross-sectional view illustrating the crash pad including the opening-inducing groove according to an embodiment.
Figure 2C:
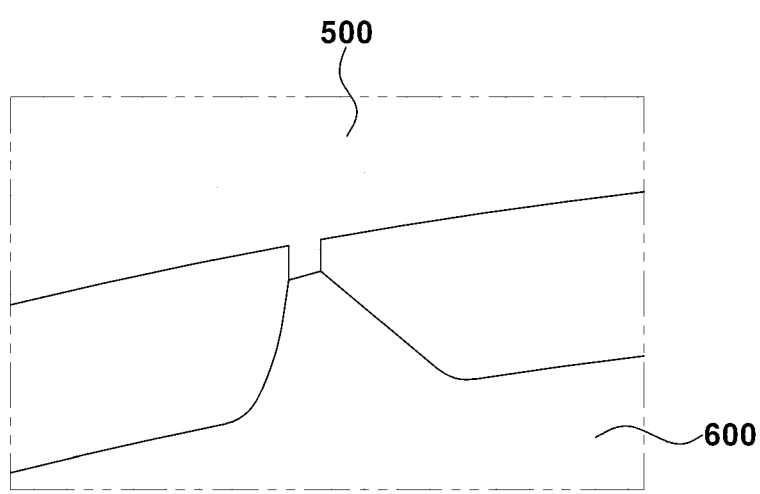
FIG. 2C is a side cross-sectional view illustrating the manufacture of the crash pad including the opening-inducing groove according to an embodiment.

FIGS. 2A and 2B are side cross-sectional views of the region of the air-bag-door-opening part 110 of the crash pad base 100. FIG. 2C illustrates the state in which an upper mold 500 and a lower mold 600 are coupled to each other so as to mold the air-bag-door-opening part 110.

As illustrated in the drawings, the crash pad base, which commonly refers to a plastic panel, has a steering wheel, an instrument panel and the like mounted on the front surface thereof so as to allow a driver to easily drive. The crash pad base is mounted between the driver's seat and the front passenger's seat adjacent to a center fascia panel on which an air conditioning button, a temperature control button, an audio button and the like are mounted.

The crash pad base 100 is manufactured through insert molding. That is, the crash pad base 100 may be manufactured through injection molding.

The injection molding, which is disclosed in this specification, may include various molding technologies such as IMG injection technology (In Mold Grain), vacuum injection molding technology, and the like.

In an embodiment, the crash pad base 100 is injection-molded by means of the upper mold 500 and the lower mold 600. The upper mold 500 and the lower mold 600 may include respective protrusions in order to form the opening-inducing groove 120.

The crash pad base 100 includes the foam layer 200, which is made of polypropylene (PP) and is positioned at an upper portion thereof, and the skin layer 300 formed on the upper surface of the foam layer 200.

The foam layer 200 is formed through a foaming process so as to be positioned at an upper level of the crash pad base 100. At least a portion of the foam layer may be introduced into the opening-inducing groove 120.

A portion of the foam layer 200 may be introduced into an upper groove 121 so as to compensate for the volume loss of the air-bag-door-opening part 110 and to prevent thermal deformation.

In other words, at least a portion of the foam layer 200, which is layered on the upper surface of the crash pad base 100 including the upper groove 121, is introduced into the upper groove 121 so as to compensate for volume loss attributable to the upper groove 121.

In an embodiment, the upper groove 121 may be configured to have therein a circular hole having a diameter of 1.0 mm to 1.5 mm.

The crash pad may include the air-bag-door-opening part 110, which is integrally formed with the crash pad base 100 and is positioned so as to correspond to the air-bag doors 400.

The air-bag-door-opening part 110 includes the opening line, which is formed so as to allow the air-bag doors 400 to be easily opened. Furthermore, the air-bag-door-opening part 110 includes the opening-inducing groove 120, which is positioned at at least a portion of the opening line. In other words, the opening-inducing groove 120 may be formed at a position corresponding to the tear seam line of the air-bag doors 400.

By virtue of the opening line including the opening-inducing groove 120, the crash pad base 100 is provided with an opening-inducing portion, thereby allowing the air-bag doors 400 to be more easily opened.

The opening-inducing groove 120 is simultaneously formed so as to be positioned at the point at which the protrusion of the upper mold 500 meets the protrusion of the lower mold 600 in an operation of molding the crash pad base 100.

The protrusion of the lower mold 600 may be configured to have a cross-sectional area that is decreased moving toward the position closest to the protrusion of the upper mold 500. Furthermore, the protrusion of the lower mold 600 may be configured to have a trapezoidal shape which is asymmetric in a lateral direction.

The protrusion of each of the upper mold 500 and the lower mold 600 may be configured to have a cylindrical shape or a truncated conical shape. In an embodiment, the protrusion of the upper mold 500 has a cylindrical shape, and the protrusion of the lower mold 600 has a truncated conical shape, thereby forming the opening-inducing groove 120.

An upper groove 121 and a lower groove 122 are respectively formed by the protrusion of the upper mold 500 and the protrusion of the lower mold 600. A connecting portion 130 is positioned between the upper groove 121 and the lower groove 122. The connecting portion 130 extends from the crash pad base 100, thereby isolating the upper groove 121 in a portion corresponding to the upper mold 500 from the lower groove 122 in a portion corresponding to the lower mold 600.

The connecting portion 130, which is positioned between the upper groove 121 and the lower groove 122, may have a thickness of 0.1 mm to 0.2 mm. The connecting portion 130 is adapted to be cut by tensile force generated at the time of expansion of the air bag.

The lower groove 122 is configured to have a cross-sectional area that increases with increasing distance from the end close to the connecting portion 130. The reason for this is to allow the connecting portion 130 to be more easily cut by the tensile force applied to the air-bag-door-opening part 110 upon opening of the air-bag door 400.

The end of the lower groove 122 that is adjacent to the connecting portion may be configured to have a circular cross-section having a diameter of 0.5 mm to 2 mm, the circular cross-section being enlarged with increasing distance from the connecting portion.

The lower groove 122, which is positioned below the connecting portion 130 in the thickness direction of the crash pad base 100, has a trapezoidal cross-section in which the cross-sectional area of the left part based on the connecting portion 130 is at least 20% smaller than the cross-sectional area of the right part based on the connecting portion 130.

More preferably, the smaller part has a cross-sectional area that is 20% to 30% smaller than the cross-sectional area of the larger part.

By virtue of the portion having the reduced cross-sectional area, it is possible to prevent the foam layer 200 and the skin layer 300, which are formed on the crash pad base 100, from drooping due to application of heat or the intrinsic weight thereof.

In short, the lower groove 122 is configured to have a cross-section in which the left part and the right part, based on the connecting portion 130, have different cross-sectional areas such that the smaller part has a cross-sectional area 20% to 30% smaller than that of the larger part.

The upper groove 121 is configured to have a small size, compared to the lower groove 122. The reason for this is to prevent breakage of the connecting portion 130 and to minimize depression of the outer surface of the crash pad during vacuum molding of the skin layer.

Figure 3A:
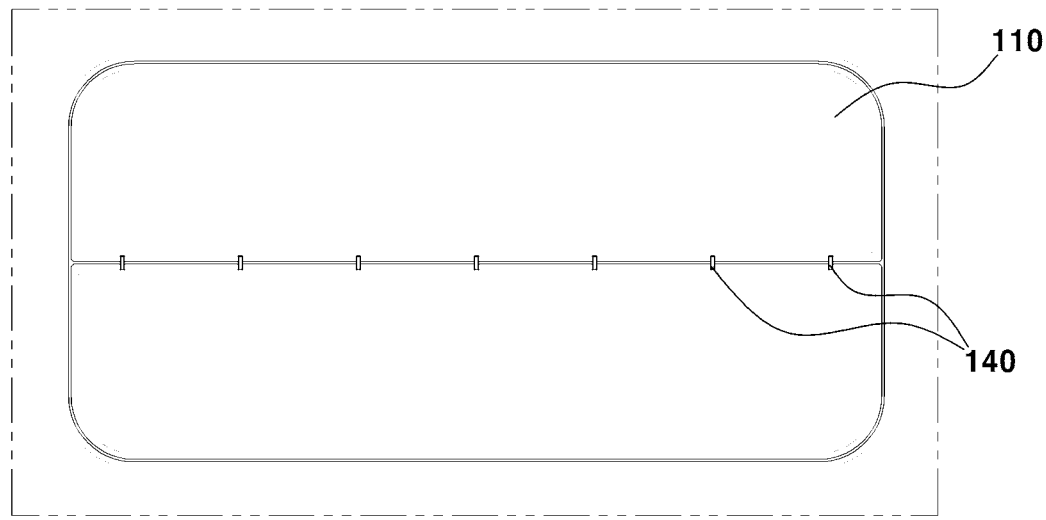
FIG. 3A is a bottom view illustrating reinforcing portions, which are positioned on the lower surface of an air-bag-door-opening part corresponding to air-bag doors according to an embodiment.

FIG. 3 illustrates at least one reinforcing portion 140, which is positioned in the lower groove 122 in the rear surface of the air-bag-door-opening part 110 so as to prevent the air-bag-door-opening part 110 from drooping.

As illustrated in FIG. 3, the reinforcing portions 140 may be made of the same material as the crash pad base 100, and may be integrally formed with the crash pad base 100 upon injection molding of the crash pad base 100. The reinforcing portions 140 are positioned on at least a portion of the rear surface of the air-bag-door-opening part 110. In an embodiment, the reinforcing portions 140 are arranged along the opening-inducing groove 120 formed in the rear surface of the air-bag-door-opening part 110 at regular intervals.

The reinforcing portions 140 may be configured to correspond to the shape of the lower groove 122, and the opening line may be formed at a position corresponding to the crash pad base 100. The reinforcing portions 140 are constructed such that the coupling force between the reinforcing portions 140 and the crash pad base 100 does not function as force that counteracts the opening force applied to the air-bag-door-opening part 110 upon expansion of the air bag.

Figure 3B:
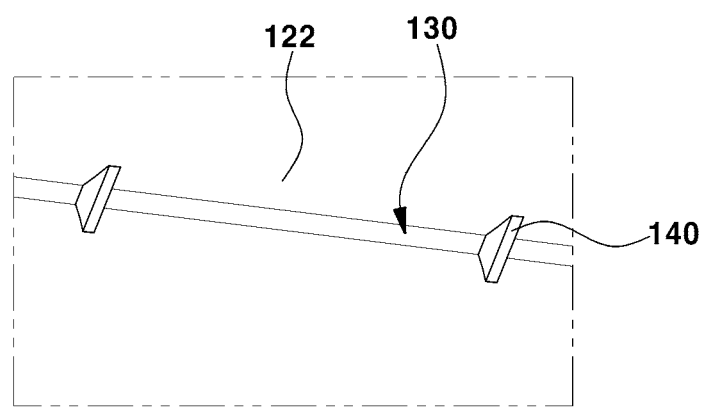
FIG. 3B is an enlarged view illustrating the reinforcing portions according to an embodiment.

As illustrated in FIG. 3B, the reinforcing portions 140 are positioned adjacent to the lower groove 122.

Specifically, the reinforcing portions 140 may be composed of ribs, which are disposed in the lower groove 122 and has the same cross-section as that of the lower groove 122, and may be fitted in at least a portion of the lower groove 122 so as to be connected to the crash pad base 100.

The reinforcing portions 140, which are provided so as to prevent the foam layer 200 and the crash pad base 100 from drooping due to the weight of the foam layer 200 and due to heat under high-temperature conditions, are positioned along the lower groove 122 at regular intervals.

Figure 4:
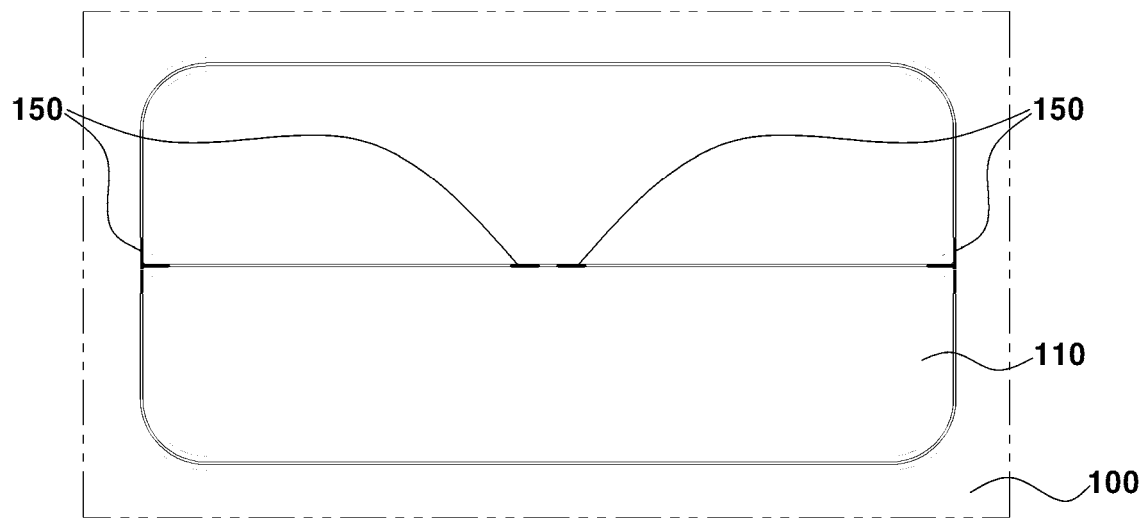
FIG. 4 is a rear view illustrating the air-bag-door-opening part including cutout portions according to an embodiment.

FIG. 4 illustrates a cutout portion 150 according to an embodiment, which is provided so as to allow the air-bag-door-opening part 110 to be easily opened.

As illustrated in FIG. 4, the cutout portion 150 may include one or more cutout portions, which are positioned along the opening-inducing groove 120. The one or more cutout portions 150 may be provided in the region along which the air-bag-door-opening part 100, which is formed so as to correspond to the double air-bag doors 400, is opened.

In an embodiment of the present disclosure, in the case in which left and right doors of the double air-bag doors 400 are constructed so as to open independently, the cutout portions 150 are formed so as to allow independent opening of the double air-bag doors 400. Specifically, the cutout portions 150 are positioned at the opening-inducing groove 120 and at the opening line, which is formed at two opposite ends of the opening-inducing groove 120 so as to be perpendicular to the opening-inducing groove 120.

When the cutout portions 150 are positioned along the opening-inducing groove 120, the cutout portions 150 may include one or more cutout portions, and each of the cutout portions 150 may be configured to have a length of 10 mm.

The cutout portions 150 can improve the ease of opening of the air-bag-door-opening part 110 upon opening of the air-bag doors 400, in cooperation with vacuum holes 160, which will be described later. The upper mold 500 and the lower mold 600 may be manufactured such that the cutout portions 150 are integrally formed with the crash pad base 100 upon injection molding of the crash pad base 100.

Figure 5:
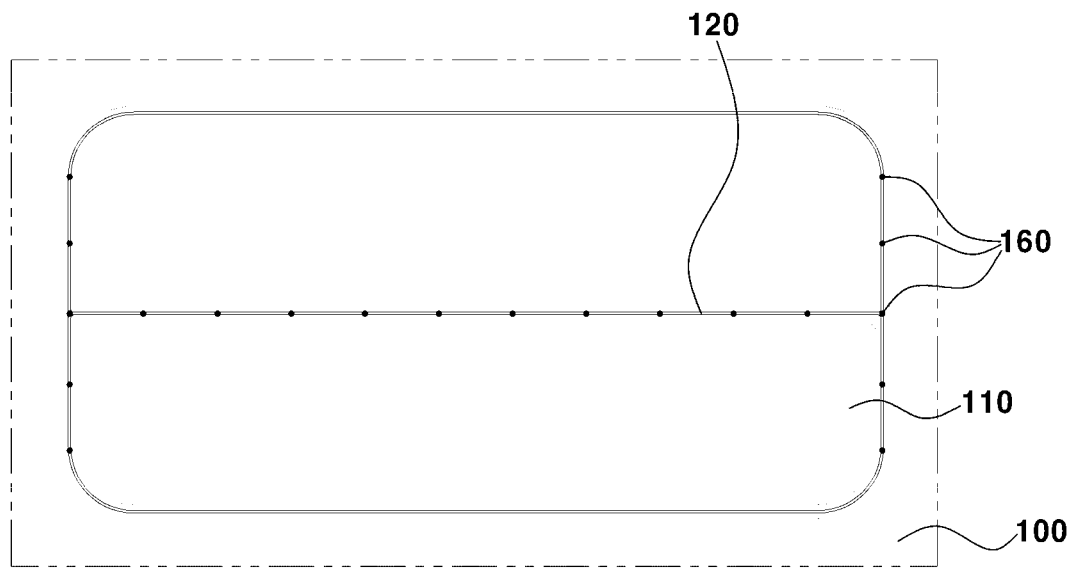
FIG. 5 is a rear view illustrating the air-bag-door-opening part including vacuum holes according to an embodiment.

FIG. 5 illustrates the opening line including the vacuum holes 160 according to an embodiment.

As illustrated in the drawing, the vacuum holes 160 are disposed along the opening line at regular intervals so as to overlap the cutout portions 150 or to be misaligned with the cutout portions 150.

In the present embodiment, the configuration of the cutout portions 150 may be considered to be the same as the vacuum holes 160, and both components may be referred to using the same term.

In short, the present disclosure provides the crash pad assembly, which includes the reinforcing portions 140, the cutout portions 150, the connecting portion 130 and the like which correspond to the air-bag doors 400 integrally formed with the crash pad base 100, thereby enabling the crash pad assembly to be integrally manufactured through a single injection-molding process without post-processing.

As described above, the present embodiments are able to achieve the following effects by virtue of the above-described constructions and structural relationships of the components.

Since the present disclosure includes the air-bag-door-opening part, which is integrally constructed so as to obviate post-processing, the components are more cost effective or economical to manufacture.

Furthermore, the embodiments described in the present disclosure decrease the defective fraction of the foam layer by virtue of the plurality of reinforcing portions, which are formed along the air-bag-door-opening part.

The above description is illustrative of the present disclosure. Further, the above disclosure is intended to illustrate and explain the preferred embodiments of the present disclosure, and the present disclosure may be used in various other combinations, modifications, and environments. In other words, the present disclosure may be changed or modified within the scope of the concepts disclosed herein, within the equivalent scope of the disclosure, and/or within the skill and knowledge of the art. The described embodiments illustrate the best state of the art to implement the technical idea of the present disclosure, and various changes may be made thereto as demanded for specific applications and uses of the present disclosure. Accordingly, the above description is not intended to limit the present disclosure to the embodiments. Further, the appended claims should be construed as encompassing such other embodiments.

What is claimed is:

1. A crash pad including an air-bag-door-opening part, comprising:
   a crash pad base;
   an air-bag-door-opening part, which is positioned so as to face air-bag doors disposed on the crash pad base; and
   an opening-inducing groove, which is formed along an opening line of the air-bag-door-opening part,
   wherein the opening-inducing groove comprises:
      an upper groove positioned in an upper surface of the crash pad base; and
      a lower groove positioned in a lower surface of the crash pad base adjacent to the upper groove in a vertical direction on the crash pad base.

2. The crash pad of claim 1, further comprising at least one reinforcing portion disposed in the opening-inducing groove formed in a rear surface of the air-bag-door-opening part.

3. The crash pad of claim 1, further comprising a cutout portion positioned at a region at which the air-bag doors meet each other.

4. The crash pad of claim 3, wherein the cutout portion is positioned at the opening line along which the air-bag-door-opening part is opened.

5. The crash pad of claim 1, wherein the lower groove is configured such that a width of a cross-section thereof is decreased moving upwards in a thickness direction of the crash pad base.

6. The crash pad of claim 1, further comprising a connecting portion, which is disposed between the upper groove and the lower groove and which is integrally formed with the crash pad base.

7. The crash pad of claim 1, further comprising a foam layer disposed on an upper surface of the crash pad base.

8. The crash pad of claim 7, further comprising a skin layer disposed on an upper surface of the foam layer.

9. The crash pad of claim 7, wherein the upper groove is formed so as to abut on the foam layer, and at least a portion of the foam layer is configured to be depressed in an inward direction of the upper groove so as to compensate for volume loss and thus to prevent thermal deformation.

10. The crash pad of claim 1, wherein the lower groove is configured to have a cross-section, which includes a left part and a right part, divided based on the connecting portion, the left part and the right part having different cross-sectional areas.

11. The crash pad of claim 10, wherein one of the left and right parts has a cross-sectional area that is 20% to 30% smaller than a cross-sectional area of a remaining one of the left and right parts.

* * * * *